United States Patent [19]

Hall

[11] 4,249,812
[45] Feb. 10, 1981

[54] DOUBLE FORMAT STILL CAMERA

[76] Inventor: Jon F. Hall, 4649 Atoll Ave., Sherman Oaks, Calif. 91243

[21] Appl. No.: 98,642

[22] Filed: Nov. 29, 1979

[51] Int. Cl.³ .................... G03B 1/00; G03B 13/10; G03B 17/02
[52] U.S. Cl. ................... 354/120; 354/159; 354/213; 354/222
[58] Field of Search ............ 354/120–125, 354/159, 206, 213, 222, 275, 276

[56] References Cited

U.S. PATENT DOCUMENTS

| | | | |
|---|---|---|---|
| 2,247,104 | 6/1941 | Takacs | 354/159 |
| 2,621,561 | 12/1952 | Andersson | 354/159 X |
| 3,678,834 | 7/1972 | Melillo | 354/159 |
| 4,146,321 | 3/1979 | Melillo | 354/159 X |

Primary Examiner—L. T. Hix
Assistant Examiner—Thomas H. Tarcza
Attorney, Agent, or Firm—Ralph B. Pastoriza

[57] ABSTRACT

The still camera in its preferred form is designed to accept the normal 35-mm. film cartridge. The camera lens and aperture, however, are offset vertically above the normal positions for the lens and aperture such that as the film is advanced, only the upper half portion of the film is exposed. The horizontal length of the image frame can be the same as a normal 35-mm. exposure while the height or width as measured vertically of the frame is one half the normal 35-mm. image. The take-up reel is especially designed to cooperate with a magazine which is provided with a lightproof slot, the spool or reel being separable from the magazine manually so that a person can easily thread the leader of the film onto the spool and insert it in the lightproof magazine. The exterior dimensions of the magazine are substantially the same as those of the cartridge, the arrangement being such that when the film has been advanced in one direction to complete exposure of the upper half of the film, the cartridge, film and magazine may be removed as an assembly, inverted and replaced with the magazine now being received in the place formerly occupied by the cartridge and the cartridge being received in the place formerly occupied by the magazine. The film is then rewound on the cartridge automatically while exposing the lower half of the film so that twice as many pictures having the same given horizontal length can be taken with a single roll of 35-mm. film as has been possible with a conventional camera.

3 Claims, 5 Drawing Figures

DOUBLE FORMAT STILL CAMERA

This invention relates to photography and more particularly to a double format still camera wherein the upper half of a film is exposed during advancement of the film in one direction and after turning the film over, the other half of the film can be exposed when advancing the film in an opposite direction.

BACKGROUND OF THE INVENTION

The normal image format for a conventional still camera is either square or rectangular with a ratio of width to length of 1 to 1.4. More often, than not, however, there are situations where it would be desirable to photograph objects which extend for a substantial distance in a horizontal direction. For example, "stretched" aircraft, parades, trains, and the like. Similarly, there are situations where a relatively long vertical format is desired such as in photographing tall buildings.

The foregoing problems have been solved by providing anamorphic type lens which will contract a horizontal dimension into a size which can be accommodated on a film image, the negative then being printed with another anamorphic lens which will stretch out the horizontal dimension or vertical dimension as the case may be.

Other solutions have involved changing the dimensions of the camera aperture such as by masking the top and bottom to provide an elongated aperture. However, with this arrangement much of a film which is unexposed is simply wasted.

BRIEF DESCRIPTION OF THE PRESENT INVENTION

With the foregoing in mind, the present invention contemplates the provision of a still camera using conventional 35-mm. film but so designed as to enable pictures to be taken in which the horizontal dimension can be three times the vertical dimension, or, if the camera is rotated 90°, pictures in which the vertical dimension is three times the horizontal dimension. The ratio 1 to 3 is merely an example, it being understood simply that the present invention provides a camera wherein one of the dimensions is substantially longer than the other so that pictures of parades, buildings and the like can be accommodated.

Moreover, the still camera of this invention accomplishes the foregoing without wasting any of the film or leaving unexposed wasted portions of the film and also without the need of any type of anamorphic lens.

More particularly, the still camera of this invention includes a casing having first and second cavities for receiving a conventional film cartridge and a specially designed magazine respectively. This magazine is provided with a lightproof film slot and incorporates a spool manually separable from the magazine to permit a film leader from the film cartridge to be secured to the spool and the spool placed in the magazine in a light tight environment. The exterior dimensions of the magazine are substantially identical to that of the cartridge, the arrangement being such that the cartridge and magazine are interchangeable in their respective first and second cavities of the camera casing by turning the same upside down.

The lens and aperture of the camera are vertically displaced such that film advanced from the cartridge to the magazine has only its upper half in registration with the lens and aperture.

With the foregoing arrangement, it can be seen that after the top half of the film has been exposed, the magazine and cartridge and end portion of the film extending therebetween can be removed from the camera as a unit, inverted and simply replaced so that advancing of the film back from the magazine onto the cartridge not only rewinds the film but also permits exposure of the lower half portion of the film.

The final result is that twice as many pictures having the same horizontal length as conventional pictures can be provided on a conventional film.

BRIEF DESCRIPTION OF THE DRAWINGS

The foregoing as well as further features and advantages of the still camera of this invention will be evident by now referring to the accompanying drawings in which.

DETAILED DESCRIPTION OF THE PREFERRED EMBODIMENT

Figure 1:
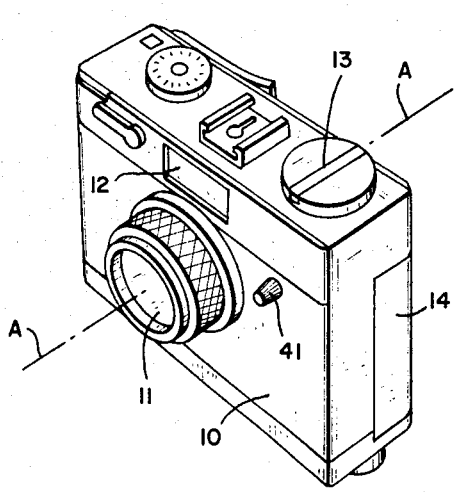
FIG. 1 is a three quarter front perspective view of the double format still camera of this invention.

Referring first to FIG. 1, the camera of this invention includes a casing 10 provided with a lens 11 on its front surface having an optic axis A—A. A viewfinder 12 in turn is positioned vertically above the lens 11 as shown. A conventional rewind control 13 may be provided but is not an essential part of the present invention. The casing 10 includes a rear access door part of which is shown at 14 in FIG. 1.

Figure 2:
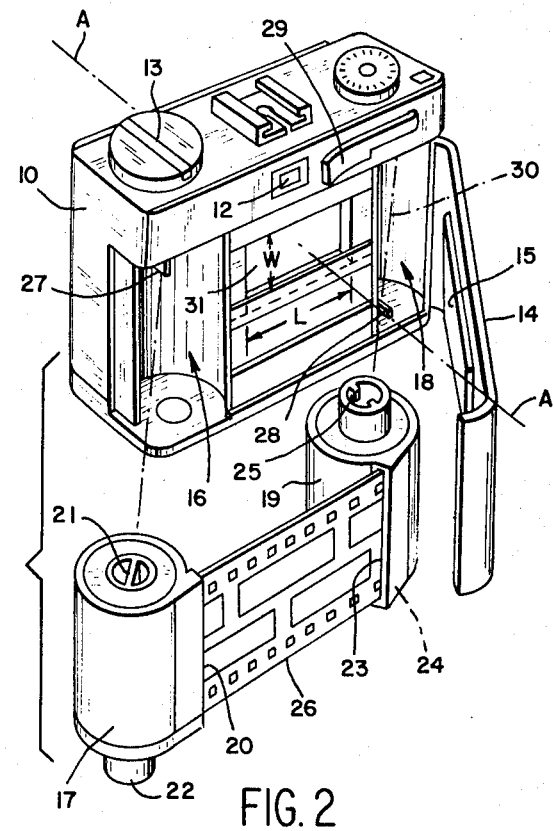
FIG. 2 is a three quarter perspective rear view of the camera with the rear access door shown open and a cartridge film and magazine assembly exploded therefrom designed in accord with the present invention.

Referring now to the rear view of FIG. 2, the door 14 is shown partially open wherein a conventional type pressure plate 15 is secured to its inner surface. One side of the casing 10 has a first cavity 16 for receiving a film cartridge such as shown exploded away at 17. A second cavity 18 is provided on the opposite side of the casing and is designed to receive a magazine 19 also shown exploded away therefrom.

Referring specifically to the film cartridge 17, the same in the example is a conventional 35-mm. film cassette or cartridge provided with a lightproof slot 20 from which the leader of the film normally extends when the film is first purchased. A spool drive coupling 21 is provided on the topside of the cartridge 17 as shown. The bottom portion of the cartridge 17 terminates in a bottom bearing 22.

Referring now to the magazine 19, this structure includes a lightproof slot 23 and houses a manually separable film spool the lower end of which terminates in a driving coupling 24 which is made substantially identical to the driving coupling 21 for the cartridge 17. The upper end of the magazine has an upper bearing 25 corresponding to the bearing 22 which structure may constitute part of the take-up spool.

Essentially, the exterior dimensions of the magazine 19 are substantially identical to the exterior dimensions of the cartridge 17 such that if the magazine 19 were inverted so that its slot 23 faced in the same direction as the slot 20 of the cartridge 17, the two items would appear to be substantially identical.

The magazine 19, however, is arranged to be manually opened so that the spool therein can be removed or inserted. With this arrangement, film indicated at 26 in FIG. 2 can have its leader received on the spool and the same assembled within the lightproof magazine 19 with the film 26 passing into the slot 23.

When the cartridge 17 is inserted into the first cavity 16 of the camera casing 10, the spool drive coupling 21 will register with a driving member 27 in the upper end of the cavity 16 connected to the rewind control 13. These elements are normally provided on any 35-mm. camera designed for use with a 35-mm. film cartridge or cassette.

Because of the symmetry of the magazine 19, the corresponding element to the driving element 21 on the cartridge 17 is in the bottom portion of the magazine 19 when in the position illustrated in FIG. 2. Accordingly, the camera structure has to be designed so that the coupling to drive the spool within the magazine 19 and thus advance the film is in the bottom portion of the second cavity 18. This driving coupling is illustrated at 28 in FIG. 2 and is arranged to be driven by an appropriate advance lever 29 through connection indicated by the vertical dashed line 30.

Still referring to FIG. 2, there is provided an aperture 31 on the optical axis A—A of the lens described in FIG. 1. This aperture has a width dimension W measured vertically no greater than one half the width of the film 26 when the same is assembled in the camera shown in FIG. 2. The length dimension running horizontally in the direction of advancement of the film of the aperture, in turn, is indicated by the letter L and is a desired given distance.

The first and second cavities are designed to support and position the film cartridge and magazine such that only the top half of the film registers with the aperture 31. In this respect, it is important to note that since the optical axis of the lens passes directly through the center of the aperture, optimum use is made of the lens in providing a proper exposure.

It will now be understood that with the above-described arrangement, the film 26 can be advanced from the cartridge into the magazine and successive exposures made only along the top half of the film with a ratio of the width to the length dimensions of the exposed image being of the order of 1 to 3.

When the exposures along the top half of the film have been completed, and with the end portion of the film still extending from the cartridge 17, the cartridge, magazine and film can be removed from the camera as a unit and simply inverted, the magazine 19 thence being received in the first cavity 16 and the cartridge 17 being received in the second cavity 18.

The drive coupling 21 for the cartridge 17 will now be positioned to engage the driver 28 connected to the advance lever 29 so that by again operating the advance lever, successive exposures can be made on the lower half of the film 26. It will be understood since the assembly has been inverted that the former lower half of the film is now the upper half of the film so that it will register with the aperture 31.

When the exposure of the lower half of the film is completed, the entire film has been properly rewound into the original cartridge and can be sent to the shop for normal processing.

It can be appreciated that each of the pictures on the film are of the same horizontal length as that of conventional format but twice as many such pictures can be provided on the same size film.

Figure 3:
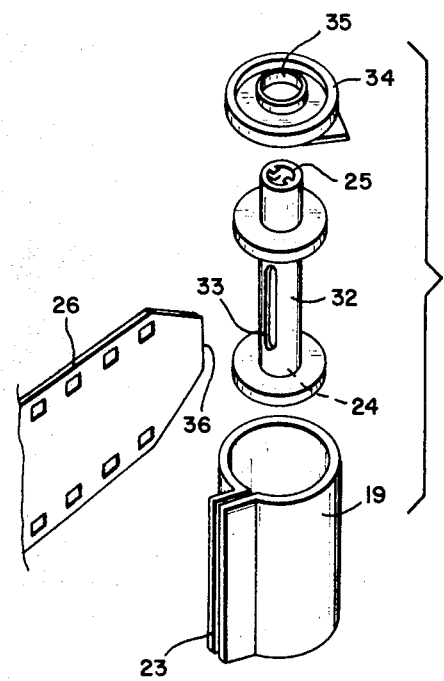
FIG. 3 is an exploded perspective view of component parts making up the magazine receiving the film illustrated in FIG. 2.

Referring now to FIG. 3, general details already described with respect to the magazine 19 will become more clear. Thus, the spool itself terminating at its lower driving element 24 is shown in FIG. 3 at 32 provided with a film leader receiving slot 33. The upper end of the spool terminating in the bearing 25 is arranged to pass through a cap 34, there being provided a friction bore opening 35 for this purpose. The leader for the film 26 is shown at 36 for manual insertion into the slot 33 as described heretofore.

From the above, the manner in which the camera is loaded will be evident. The spool 32 is first separated from the magazine 19 and the leader end 36 of the film 26 inserted in the slot 33. The spool and lower edge of the film can then be slid into the magazine 19, the film 26 being received in slot 23. The cap 34 with the bearing portion 25 of the spool extending through the bore 35 is then assembled onto the top of the magazine 19 and the same inserted in the second cavity 18.

Figure 4:
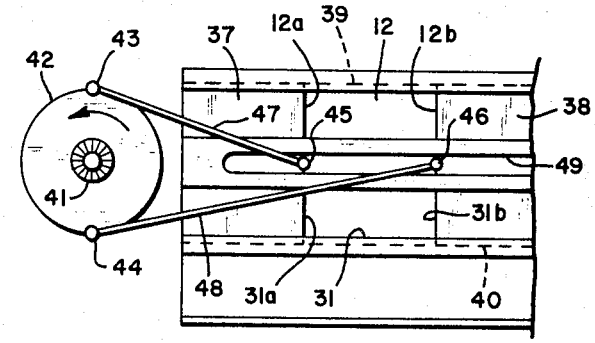
FIG. 4 is a fragmentary schematic view illustrating the manner in which a first adjustment can be effected in the camera.

Referring now to FIG. 4 there is schematically illustrated a further feature of the present invention wherein the actual given horizontal length of the aperture designated L in both FIGS. 2 and 4 can be changed should it be desired to increase or narrow the horizontal length dimension of the picture.

Towards the foregoing end, the opposite vertical edges of both the aperture 31 and the view finder 12 are defined by first and second panels 37 and 38 mounted for guided horizontal movement towards and away from each other. The opposing edges or vertical edges of these panels indicated at 31a and 31b define the width of the aperture and the upper opposed edges 12a and 12b define the width of the viewer.

A manually controllable knob indicated at 41 to the left of FIG. 4 and also shown on the front of the camera casing 10 in FIG. 1 has secured to it a disc 42. Opposite diametric points of this disc are provided with pivots 43 and 44. Pivots 45 and 46 are also provided on the panels intermediate their upper and lower edges. Rod elements 47 and 48 are respectively coupled between the pivot points 43 and 45 and the pivot points 44 and 46 as shown. By having the pivot points 45 and 46 in horizontal alignment when the pivot points 43 and 44 are in vertical alignment, it can be seen that rotation of the manually controllable knob 41 in a counterclockwise direction, for example as viewed in FIG. 4 will cause the aperture horizontal length L and the viewer horizontal length to increase simultaneously. Rotation of the knob 41 in a clockwise direction, on the other hand, will close up the aperture and viewer simultaneously. Slot 49 formed in the casing structure between the viewer 12 and the aperture 31 serves as a guide for the pivot pins 45 and 46 in their movement towards and away from each other.

Figure 5:
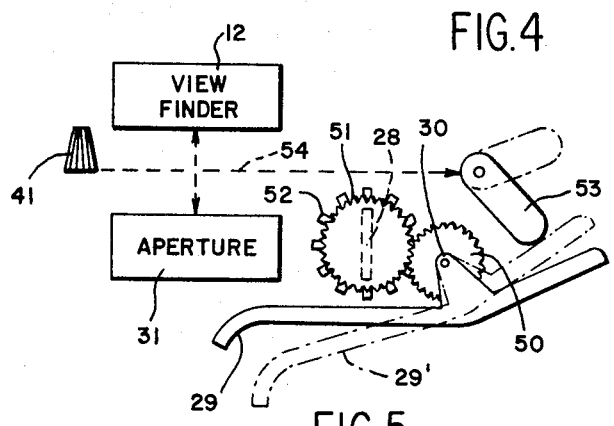
FIG. 5 is another schematic view illustrating the operation of a second adjustment which is carried out simultaneously with the adjustment indicated in FIG. 4.

Referring now to FIG. 5 there is schematically indicated means for advancing the film a greater or lesser distance by the advancing lever 29 in accordance with the setting of the horizontal length of the aperture and viewer so that regardless of the manner in which the manual knob 41 is positioned, successive pictures along the horizontal top portion of the film will be adjacent to each other.

Referring specifically to FIG. 5, the view is taken looking down in a vertical direction, the advance lever 29 being coupled by shaft 30 indicated in dashed lines in FIG. 2 and appropriate gears 50 and 51 to the film spool driver 28 indicated in phantom lines. Above the gear 51 and connected thereto is a sprocket drive 52.

It will be seen from above that advancement of the lever 29 to the dotted line position 29', for example, will rotate the gear 50 to rotate the gear 51 and the sprocket drive 52. The amount of movement of the advance lever 29, however, is limited by a stop constituting an eccentric member 53 schematically illustrated in FIG. 5, the rotational positioning of this stop 53 being under control of the manually operable knob 41 by way of mechanical connection indicated at 54. The aperture and viewfinder openings 31 and 12 respectively are also indicated in FIG. 5 as operable by the knob 41 all as described with respect to FIG. 4

When the stop 53 is in the solid line position shown in FIG. 5, the advance lever 29 can only be moved a minimum distance to advance the film a minimum distance. Under these conditions, the aperture and viewfinder horizontal opening would be in minimum positions.

When the knob 41 is rotated to move the stop 53 to its dotted line position thereby permitting a greater swing of the advanced lever 29, this movement of the control knob will simultaneously open up the aperture and the viewer to provide a horizontal length corresponding to the advance distance of the film effected by operation of the advance lever 29 as controlled by the stop 53.

From all of the foregoing, it will thus be evident that the present invention has provided a very simple and useful still camera wherein, as mentioned heretofore, twice as many pictures having the same normal horizontal length can be taken as is possible with conventional cameras. Moreover, the desirable high ratio of horizontal length to vertical height is realizable in the final print and there is no loss in fidelity. Finally, by means of the simple mechanical expedients described in FIGS. 4 and 5, the given horizontal length of the projected image onto the film can be controlled and at all times, the maximum amount of film is used; that is, there is no wasted film as might occur were not the amount of film advancement automatically controlled with respect to the horizontal size of the aperture.

I claim:

1. A double format still camera, including in combination:
   (a) a casing having a rear access door with a film pressure plate;
   (b) a first cavity in one side of said casing for receiving a film cartridge;
   (c) a second cavity on the opposite side of said casing;
   (d) a magazine with a lightproof film slot;
   (e) a spool manually receivable in and separable from said magazine to permit attachment of a film leader from a film cartridge to said spool, the spool then being placed in the magazine in a light-tight environment with the film leader passing into said slot, said spool having a driving coupling at one end exposed through one end of said magazine;
   (f) a spool driver in one end of said second cavity for engaging said driving coupling so that said film can be advanced from a cartridge placed in said first cavity onto said spool in said magazine in said second cavity;
   (g) an advancing lever on said casing coupled to said spool driver, said magazine and cartridge having substantially identical exterior dimensions such that said magazine and cartridge can be turned upside down and interchanged in said first and second cavities respectively so that said spool driver in said one end of said second cavity will register with and couple to the drive coupling for the spool in said cartridge normally used for rewinding purposes;
   (h) a lens on the front of said casing; and,
   (i) an aperture in said casing on the optical axis of said lens, said aperture having a width dimension as measured vertically no greater than one half the width of a film in said cartridge and a given length dimension running horizontally in the direction of advancement of said film, said first and second cavities supporting and positioning said film cartridge and magazine such that only the top half of said film registers with said aperture whereby after said film has been advanced from said cartridge into said magazine to expose the top half thereof, said magazine and cartridge with the end portion of said film still extending from said cartridge can be turned upside down as an assembly and the magazine received in said first cavity and the cartridge received in said second cavity, advancing of the film permitting the lower half of the film to be exposed until all of the film has been received into the cartridge so that advancement of the film from the magazine into the cartridge serves to simultaneously rewind the film as well as permit a second series of exposures on the lower half of the film to take place resulting in the provision of twice as many pictures with the same horizontal length as can be provided with conventional cameras.

2. A still camera, according to claim 1, in which said casing has a viewfinder vertically above said aperture; opposed vertical eclipsing panels defining the opposite vertical edges of said aperture and viewfinder; means for mounting said panels for sliding movement towards and away from each other to thereby change simultaneously the horizontal length of said viewfinder and aperture; manually movable means on said casing defining an adjustable stop position for said advance lever so that a given length of film only is advanced upon operation of said lever; and coupling means connected between said manually movable means and said panels for simultaneously moving said panels to define said given length whereby the horizontal length of an exposed picture of said film is controllable.

3. A still camera according to claim 2, in which said manually movable means is a rotatable knob and said coupling means comprises a disc secured to said knob and having diametrically opposite pivot points, said panels having, respectively, pivot points intermediate their upper and lower edges; and elongated rods connected at opposite ends between the pivot points on said disc and the pivot points on said panels respectively such that rotation of said disc in one direction moves said panels towards each other and in an opposite direction moves said panels away from each other.

* * * * *